March 9, 1954     A. J. DI CARA     2,671,637
AUTOMOBILE JACK
Filed May 18, 1951
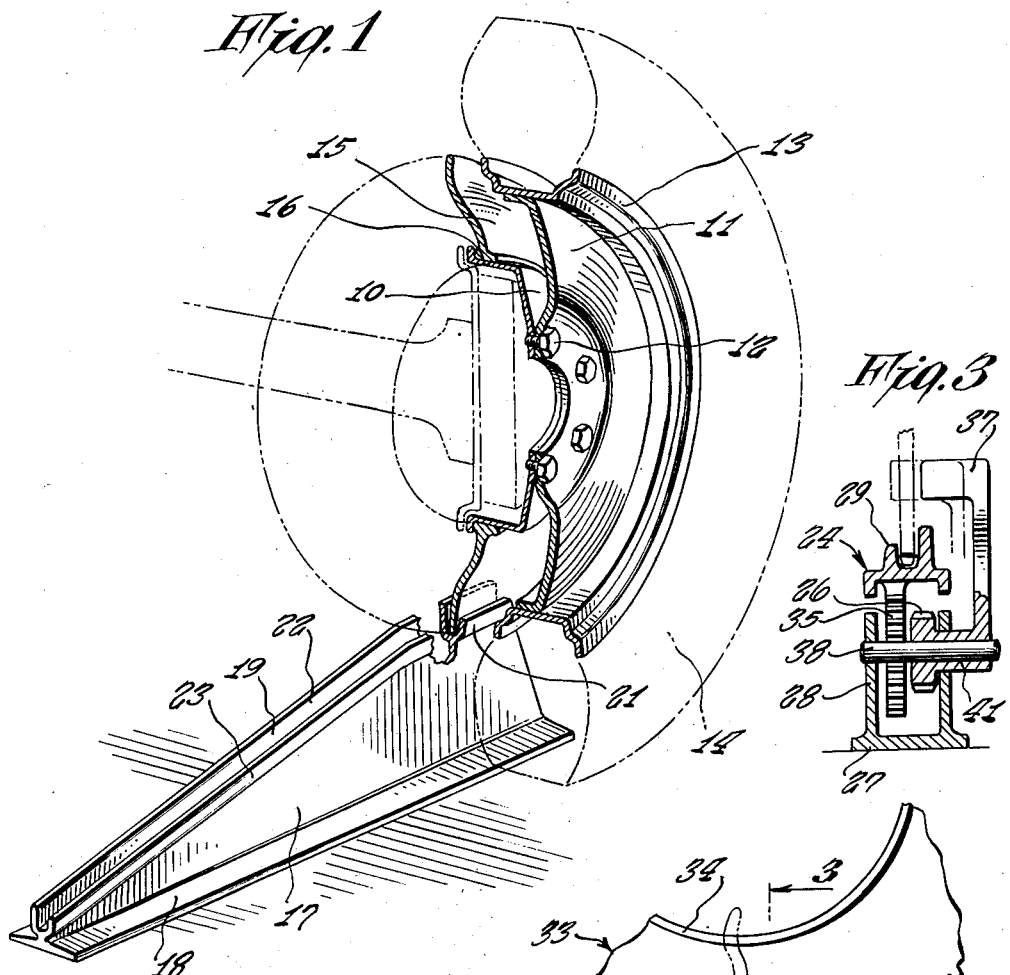
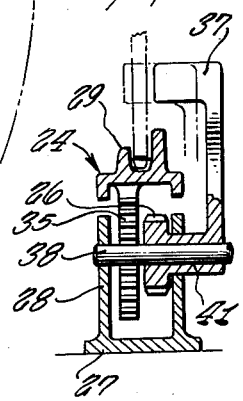
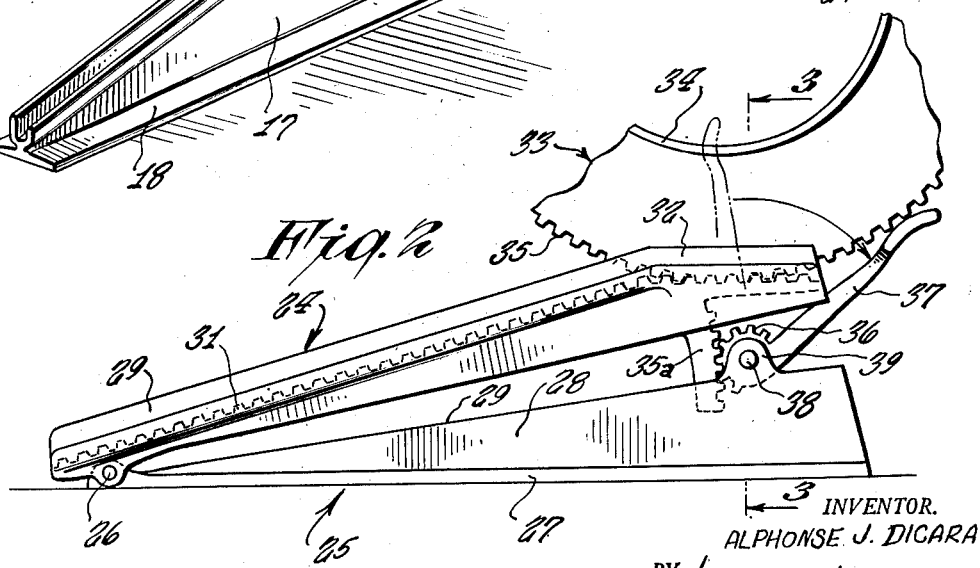
INVENTOR.
ALPHONSE J. DICARA
BY
ATTORNEY Patented Mar. 9, 1954

2,671,637

UNITED STATES PATENT OFFICE 2,671,637

AUTOMOBILE JACK

Alphonse J. Di Cara, Astoria, N. Y.

Application May 18, 1951, Serial No. 227,050

5 Claims. (Cl. 254—88)

This invention relates to an automobile wheel lift.

It is an object of the invention to provide an automobile wheel lift comprising an annular plate, fixed to the brake drum of the wheel and adapted to engage with and run over a small ramp that can be quickly located under the edge of the plate, whereby as the vehicle is moved along, the same will be elevated to free the demountable rim and tire.

It is another object of the invention to provide a vehicle wheel lift employing a rim and a ramp wherein the ramp is formed of hinged elements normally lowered and wherein such elements will be separated at the end of the movement of the lifting plate over the ramp and upon engagement of a lever having pinion gear teeth operable upon a rack that effects the separation of the upper ramp part from the lower part and to finally elevate the vehicle wheel to the full distance and to free the tire from the ground.

Other objects of the invention are to provide a vehicle wheel lift comprising a rim and a ramp, which is of simple construction, inexpensive to manufacture, has a minimum number of parts, permits the vehicle to lift itself under its own power, easy to install beneath the vehicle, consumes little space, automatic in operation, and efficient in use.

For a better understanding of the invention reference may be had to the following detailed description taken in connection with the accompanying drawing, in which:

Fig. 1 is a fragmentary perspective view of a vehicle wheel having a lift plate and of a ramp over which the lift plate travels to elevate the vehicle wheel.

Fig. 2 is a fragmentary side elevational view of a modified form of the invention having rack teeth and an elevating gear for separating the ramp parts.

Fig. 3 is a vertical sectional view taken on line 3—3 of Fig. 2 with the lift pinion disengaged from the vertically extending rack of the upper ramp part.

Referring now to the figures, 10 represents a brake band to which a tire rim plate 11 is normally attached by securing bolts 12. Fixed to this tire rim plate 11 is the usual tire rim 13 for retaining the tire 14.

A lift plate 15 of annular shape has an enlarged inner periphery 16 which is secured to the brake band or cover 10 by welding. This plate 15 is dished so that its outer peripherial edge will be spaced from the inner flange of the tire rim 13.

A ramp 17 has a bottom flange 18 and a guideway 19 in its top edge which is inclined. This guideway 19 straightens out at the high point of the ramp as indicated at 21, whereby to hold the wheel of the vehicle in an elevated position. The guideway 19 has a raised inner flange 22 over which the peripherial edge of the plate 15 extends. An outer flange 23 is of less height than the flange 22.

In operation the ramp 17 will be located under the wheel and the vehicle will, under its own power, be moved forwardly or rearwardly to cause the plate 15 to move upwardly upon the guideway. The height of the ramp is sufficient to free the tire 14 of the ground surface. Once the tire has been changed, the continued movement of the vehicle in a forward direction can quickly lower the vehicle wheel and its tire upon the ground surface. The lifting plate 15 remains upon the brake housing and the ramp 17 can be removed therefrom and stored easily in the vehicle.

Referring now particularly to Figs. 2 and 3, there is shown a ramp having upper and lower parts 24 and 25 separable from one another and hinged at their forward ends by a pin 26. The bottom ramp part 25 has a supporting flange 27 and an upstanding rib 28 having an inclined edge 29.

The upper part 24 has a guideway 29 in the bottom of which are rack teeth 31. The guideway 29 is inclined and extends horizontally at its elevated end as indicated at 32. The rack teeth 31 extend throughout the entire length of the guideway and even over the straightened out portion 32 thereof.

The lift plate is similarly secured to the brake casing. This plate indicated at 33 has an inner attaching flange 34. On the other edge of the plate 33 are gear teeth 35 corresponding to the rack teeth 31 and adapted to engage therewith to positively cause the elevation of the plate 33 and accordingly the vehicle wheel upon the ramp.

The parts 24 and 25 of the ramp are closed upon one another at the start of the movement of the vehicle wheel lift plate 33 thereover. The parts are held fluid throughout substantially the full travel of the wheel lift plate over the part 24.

Depending from the part 24 is a rack 35a with which gear teeth 36 of a lever 37 engage. The lever 37 is pivotly connected by a pin 38 for pivotal adjustment on a raised boss 39 on the rib 28 of the lower ramp part 25. The teeth 36 on the lever 37 form a pinion gear, and upon the outer end of the gear 37 being struck by the plate 33 a quick upward thrust of the upper part 24 is effected.

As shown in Fig. 3, the bottom part 25 of the ramp has laterally spaced webs 28. The pin 38 extends between one of the webs 28 and a hub formation 41 on which the pinion gear teeth 36 are formed. The hub 41 is in turn journalled on the other web of the part 25, and is slidable along the pin 38 to be brought into or out of engagement with the vertically extending rack formation 35 of the upper part 24.

This lever 37 is normally disposed in the position shown in dot and dash lines in Fig. 2, and as the vehicle lift plate 33 comes to the straightened out portion of the guideway 29, it will be engaged so that by the time the wheel lift plate 33 is on the portion 32 the full separation of the upper and lower parts of the ramp will have been effected.

The lowering of the wheel is effected more gradually as the upper and lower parts collapse and upon the rearward movement of the plate 33 over the ramp.

It will accordingly be seen that with the arrangement shown in Fig. 2 that the additional lifting action of the wheel is effected under the weight of the plate 33 upon the lever 37 and at the end of the movement of the plate over the ramp.

By having the pinion gear 26 adjustable on the pin, the additional lifting of the wheel can be effected at the option of the user of the ramp. If it is not desired that the upper ramp parts 24 be lifted at the end of the movement on the ramp, the pinion 35 is made free of the rack 35. The lever 37 will thus be dropped and lowered on to the lower ramp part 25, and positioned out of the way from the plate 33.

It should now be apparent that there has been provided a vehicle lift which is operated by the power of the vehicle as the same is moved upwardly over the ramp and thereby eliminating the heavy work required with the use of the ordinary jacks. It will also be seen that by the provision of a ramp under the vehicle that a centering of the same in alignment with the wheel lift plate can be effected easier than centering a jack under an axle housing.

While various changes may be made in the detail construction, it shall be understood that such changes shall be within the spirit and scope of the appended claims.

I claim:

1. A vehicle wheel lift comprising a circular wheel lift plate extending beyond the wheel rim adapted to be attached to a brake housing and having a peripherial edge, a rack having an inclined upper part and a lower part, said parts being hinged together at one end thereof, said upper part having a guideway receiving the peripherial edge of the left plate and means engageable by the lift plate and responsive to the movement thereof on the ramp to separate the upper and lower parts and to give additional lift to the vehicle wheel.

2. A vehicle wheel lift comprising a circular wheel lift plate extending beyond the wheel rim adapted to be attached to a brake housing and having a peripherial edge, a rack having an inclined upper part and a lower part, said parts being hinged together at one end thereof, said upper part having a guide way receiving the peripherial edge of the lift plate and means engageable by the lift plate and responsive to the movement thereof on the ramp to separate the upper and lower parts and to give additional lift to the vehicle wheel, said guide way of the ramp part having gear teeth and said peripherial edge of the lift plate having gear teeth, whereby positive movement of the lift plate over the ramp will be effected.

3. A vehicle wheel lift comprising a circular lift plate extending beyond the wheel rim adapted to be attached to a brake housing, a ramp comprising separable upper and lower parts, said parts being hinged together at one end thereof, said upper part having a depending rack at the opposite end of the ramp, said lower part having a lever with a pinion gear formation thereon engageable with said vertically extending rack, said lever extending upwardly into the path of the lift plate along the guide way and engageable by the lift plate on its travel over the ramp to cause separation of the ramp parts at the end of travel of the lift plate over the ramp.

4. A vehicle wheel lift comprising a lift plate adapted to be attached to a brake housing, a ramp comprising separable upper and lower parts, said parts being hinged together at one end thereof, said upper part having a guideway and a depending rack at the opposite end of the ram said lower part having a lever with a pinion gear formation thereon engageable with said vertically extending rack, said lever extending upwardly into the path of the lift plate along the guide way and engageable by the lift plate on its travel over the ramp to cause relative movement of the ramp parts at the end of travel of the lift plate over the ramp, and a pin carried by said lower ramp part and said lever axially adjustable upon said pin for engagement with the vertical rack teeth to position the lever for engagement by the lift plate and adjustable along the pin for disengagement of the pinion gear with the vertical rack to have the lower ramp part support the upper ramp part.

5. A vehicle wheel lift comprising a lift plate adapted to be attached to a brake housing, a ramp comprising separable upper and lower parts, said parts being hinged together at one end thereof, said upper part having a guide-way and a depending rack at the opposite end of the ramp, said lower part having a lever with a pinion gear formation thereon engageable with said vertically extending rack, said lever extending upwardly into the path of the lift plate along the said guide way and engageable by the lift plate on its travel over the ramp to cause relative movement of the ramp parts at the end of travel of the lift plate over the ramp, and said guide way on the ramp having rack teeth, said lift plate having gear teeth operable over the rack teeth whereby positive lifting action is effected upon the movement of the lift plate over the ramp.

ALPHONSE J. DI CARA.

References Cited in the file of this patent

UNITED STATES PATENTS

| Number | Name | Date |
|---|---|---|
| 1,100,932 | Warner | June 23, 1914 |
| 1,144,004 | Shumway | June 22, 1915 |
| 1,490,033 | Schornack | Apr. 8, 1924 |
| 1,492,401 | Schornack | Apr. 29, 1924 |
| 2,203,774 | Cornelissen | June 11, 1940 |